J. W. JAYNE.
BRICK MACHINE.
No. 746. Reissued June 28, 1859.
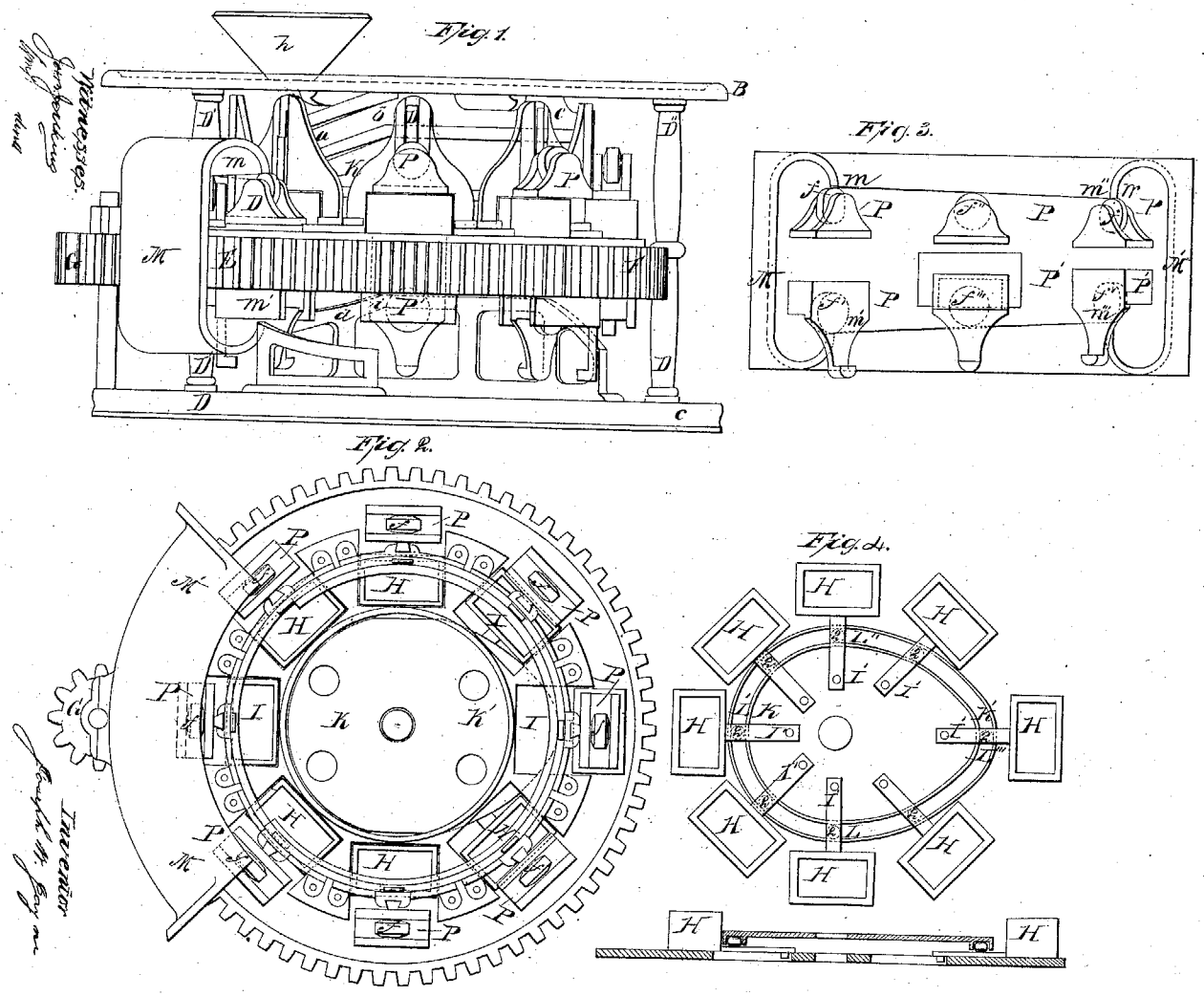

UNITED STATES PATENT OFFICE.

JOSEPH W. JAYNE, OF SANDUSKY, OHIO.

IMPROVEMENT IN BRICK-MACHINES.

Specification forming part of Letters Patent No. 17,220, dated May 5, 1857; Reissue No. 746, dated June 28, 1859.

*To all whom it may concern:*

Be it known that I, JOSEPH W. JAYNE, of Sandusky, Erie county, Ohio, have invented a new and useful Improvement in the Construction of Brick-Machines; and I do hereby declare the following to be a full and exact description of the same, reference being had to the annexed drawings, making a part of this specification, in which—

Figure 1 is a side view of my machine. Fig. 2 is a top view of my machine with the upper cover or frame removed. Fig. 3 is a view of a portion of my machine, called the "yoke," detached. Fig. 4 is an inverted view, or a view as seen from below, of a fixed central plate, showing an eccentric slot or guide on its lower surface. Fig. 5 is a sectional view of the same.

A B C D is the frame of my machine, which consists of a circular bed or base, D C, from the circumference of which rise six columns, D D′ D″ D‴, &c., to support the upper frame or top of the machine, A B. This top A B is also circular. A central spindle rests upon a step in the center of the bed or base of the machine, and is supported above by a journal in the center of the top frame, A B. On this spindle is placed a main revolving disk-wheel, E F. This wheel E F should be about four feet in diameter or larger. Around the entire circumference of this wheel a series of cogs are formed, and the wheel is driven by a smaller pinion or cog wheel, G, geared to it, and which smaller wheel is connected with a prime mover of any suitable description. The wheel E F is a continuous disk, made of iron or other metal. Around the circumference of this disk a series of rectangular openings are cut, and a series of rectangular molds are fitted to these openings of the precise sectional shape of a brick, but of greater depth—say, a depth of about ten inches. These molds are made of cast-iron, planed accurately on the inner surface, and secured to the disk-wheel by bolts and flanges or other similar means. A series of rectangular boxes or frames, H H H H H, open above and below, are placed around the upper surface of the disk-wheel E F. These boxes H H H, &c., are of the same internal length as the molds, but are about two inches wider than the molds. They are for the purpose of charging or filling the several molds with clay. On the inner side of each charger H H H H a stem, I I′ I′ I′, &c., is attached, and on each stem there is a small friction roller, *i i*, which fits into an eccentric groove cut or formed on the under surface of a central fixed plate, K K′. This plate K K′ is a cast-iron disk or plate, and is permanently suspended by four or more standards or uprights from the top frame-piece, A B. On the under side of this disk is cut an eccentric groove, which can be seen by the inverted view shown in Fig. 4 by L L′ L″ L‴. L L′ L″ is a true circle, and the rest, L L‴ L″, is of an eccentric shape, as shown in Fig. 4. There are also a series of radial grooves formed upon the upper surface of the disk-wheel E F for the purpose of guiding the chargers H H H H as they slide in and out. The effect of the eccentric groove L L′ L″ L‴ in the plate K K′, and the friction-wheels *i i*, is such that as the wheel E F revolves each of the chargers H H H H is made at one part of the revolution to pass under the spout or mouth of the hopper *h* and becomes filled with clay, and after passing from the hopper *h* each charger is slid or pushed radially out over one of the molds and begins to discharge its clay into the mold, and continues to slide out farther and farther and discharging its clay into the mold until the mold is completely filled. Each charger then successively slides radially back, and in succession passes again under the hopper to be filled and again to charge the molds. This arrangement of the chargers H H H, in connection with the groove on the plate K K′, I regard as one of the important features of my improved machine on account of the regularity and certainty of its action. The molds, however, may be filled without the intervention of the chargers. The clay so charged in succession into the molds is afterward pressed in each of the molds in the following manner: On each side of each mold a small presser or follower fits. These pressers or followers are shown at P P, Fig. 3. Each follower is made of cast-iron and has a stem attached to it carrying a small friction-roller, *e e*, and the larger friction-roller, *f f*, is also attached to each presser or follower. These followers or pressers P P′ correspond in section to and fill precisely each of the molds. These followers are made to approximate their pressing-surfaces onto the clay by means of their friction-rollers *f f* passing in the course of the revolution of the wheel E F between the converging surfaces of two inclined circular planes.

The two converging planes are constructed as follows: A heavy shell of cast-iron, curved horizontally to correspond with the circumference of the mold-wheel, and of the necessary length, is cast. It is curved in a perpendicular direction—that is to say, the outside or back of this casting, from a line drawn horizontally through its center, or from a similar line above or below the center, is curved upward and inward toward the mold-wheel, and finally downward, its extremity in this direction forming the upper plane, a similar curvature downward, inward, and upward forming the lower plane. To increase its strength, as well as for convenience of attaching to the frame-work of the machine, a flange is turned outward at each end and, if necessary, upon its convex surface. This arrangement I denominate the "yoke," and it is shown in Fig. 3. The position and effect of these converging planes or surfaces of the yoke M M′ is shown in Fig. 3 by $m\,m''$, and $m'\,m'''$. $f$ and $f'$ $f''$ and $f'''$ $f^{iv}$ and $f^{v}$ represent three successive pairs of pressers. $f$ and $f'$ are just entering between the planes, $f''$ and $f'''$ are half-way through the planes, and consequently their pressing surfaces are approximated to one-half of the full extent of pressure, and $f^{iv}$ and $f^{v}$ are just at the extremity of the converging planes, and consequently the extent of pressure exerted here is a maximum.

This mode of employing double converging inclined circular planes in connection with the upper and lower presses, P and P′, furnishes a very convenient method of bringing pressure upon the clay in the mold. The pressure is very effectively brought upon both sides of the brick equally and simultaneously. The pressure also is brought on and increased gradually, and the work is uniform and continuous. The comparative power required to produce a complete and sufficient pressure is also smaller than in any other apparatus with which I am acquainted. The converging planes by which the pressure is effected ought to be entirely rigid, immovable in their relation to the mold-wheel, and of sufficient strength to withstand any degree of pressure that may be required. The tendency of the pressing-rollers when compressing the clay in the mold, the one pressing upon the upper surface of the lower plane and the other against the under surface of the upper plane, is of course to force the two planes more widely asunder. They require, therefore, to be linked or bound together in the firmest manner possible. Moreover, as these planes ought properly to be placed the one perpendicularly over the other, and as the radius of the circle which they would produce were they continued around is much less than that described by the periphery of the mold-wheel, it follows that they cannot be connected with each other by any supports which shall pass directly from one to the other. Therefore, to secure these planes in a proper position, and to retain them permanently in place, it is necessary that they should be held by supports or appliances placed outside of the machine, at a sufficient distance to offer no impediment to the mold-wheel.

The strain necessary to compress dry or untempered clay sufficiently solid for good bricks is so great that a heavy frame-work is necessary to give the requisite degree of strength and firmness.

The upper presser has a stem or shank projecting upward, by which it is held in a vertical position and guided in its movements up and down. This stem is attached to the body of the presser on the inner side, and not directly over the mold, as in other machines. At the upper end of this stem is a friction-roller, the purpose of which is, by passing at the proper point upon a track inclined upward, to lift the pressure off the formed brick and elevate it sufficiently high to permit the chargers to pass freely underneath them. From this point, the track continuing level, the friction-roller carries the presser around until it has arrived near the yoke, where the track, curving downward, permits the presser to descend upon the clay in the mold. A pin or stub, or any other suitable contrivance, may be substituted for this friction-roller in order to elevate the presser.

The lower presser has the bearings of its friction-roller placed in a similar position in reference to its pressing-surface and the center of the mold, and has on one or both sides of it a guide stem or shank projecting downward, to which is attacked a lateral projection or stub, which latter performs a similar office for the lower presser to that effected by the small friction roller for the upper presser.

The operation of the several parts of my machine is as follows: The main disk-wheel E F, carrying the brick-molds, (say eight or more on its circumference,) is kept regularly and constantly revolving—say, about six to ten revolutions per minute. Each charger H, at one part of the revolution of E F, successively passes under the hopper $h$, and becomes filled with a supply of clay rather more than sufficient to make a brick. The chargers in succession move radially out and fill the molds, and then slide radially in again to be in turn filled. After the mold is thus filled by the charger, the upper and lower followers, P P′, (which had been previously kept apart by the track $a\ b\ c$, and a corresponding lower track,) are released from these tracks, and rest upon the surface of the clay above and below. The revolution of E F now brings each pair of followers P and P′ successively between the converging surfaces $m\ m''$ and $m'\ m'''$ of the yoke M M′, and as the rollers $f$ and $f'$ roll along the planes $m\ m''$ and $m'\ m'''$, the pressers P and P′ are forced together, and a gradual and powerful pressure is exerted upon the clay in the mold, and this continues until the pressers pass from the extremity of the yoke, when the track *a b c* and the rollers or projections *e e* cause the upper pressers to rise entirely above the mold, and high enough to allow the brick to escape above, and a small inclined track, *d i*, causes the lower presser to rise through the mold and push up the formed brick to the level of the upper surface of the wheel E F, whence it can be removed by hand or be slid off to an adjoining table. The upper pressers P are raised and sustained high enough by the track *a b c* to permit the free passage of the chargers H H beneath.

I do not claim the combination and use of two converging planes for effecting the pressure, nor of two plungers or pressers, acting the one from above and the other from below; but What I do claim, and desire to secure by Letters Patent, is—

1. The yoke constructed of the form above described, by which the converging planes are held firmly in the same position relative to each other, whether the same be composed of one or more pieces of metal.

2. The radial sliding and revolving chargers, in combination with the mold-wheel.

3. The arrangements of the guide-stem on the side of the pressers instead of on the end, whereby I am enabled to place the pressing-roller in the cavity of the piston.

4. Making the piston or presser hollow and inserting the pressing-roller in the cavity thereof, (instead of placing it upon a guide-stem,) as heretofore done.

JOSEPH W. JAYNE.

Witnesses:

J. H. B. JENKINS,

WM. W. HARDING.